Aug. 1, 1950      A. W. METZNER      2,516,899
AUTOGRAPHIC REGISTER
Filed May 14, 1945      6 Sheets-Sheet 1
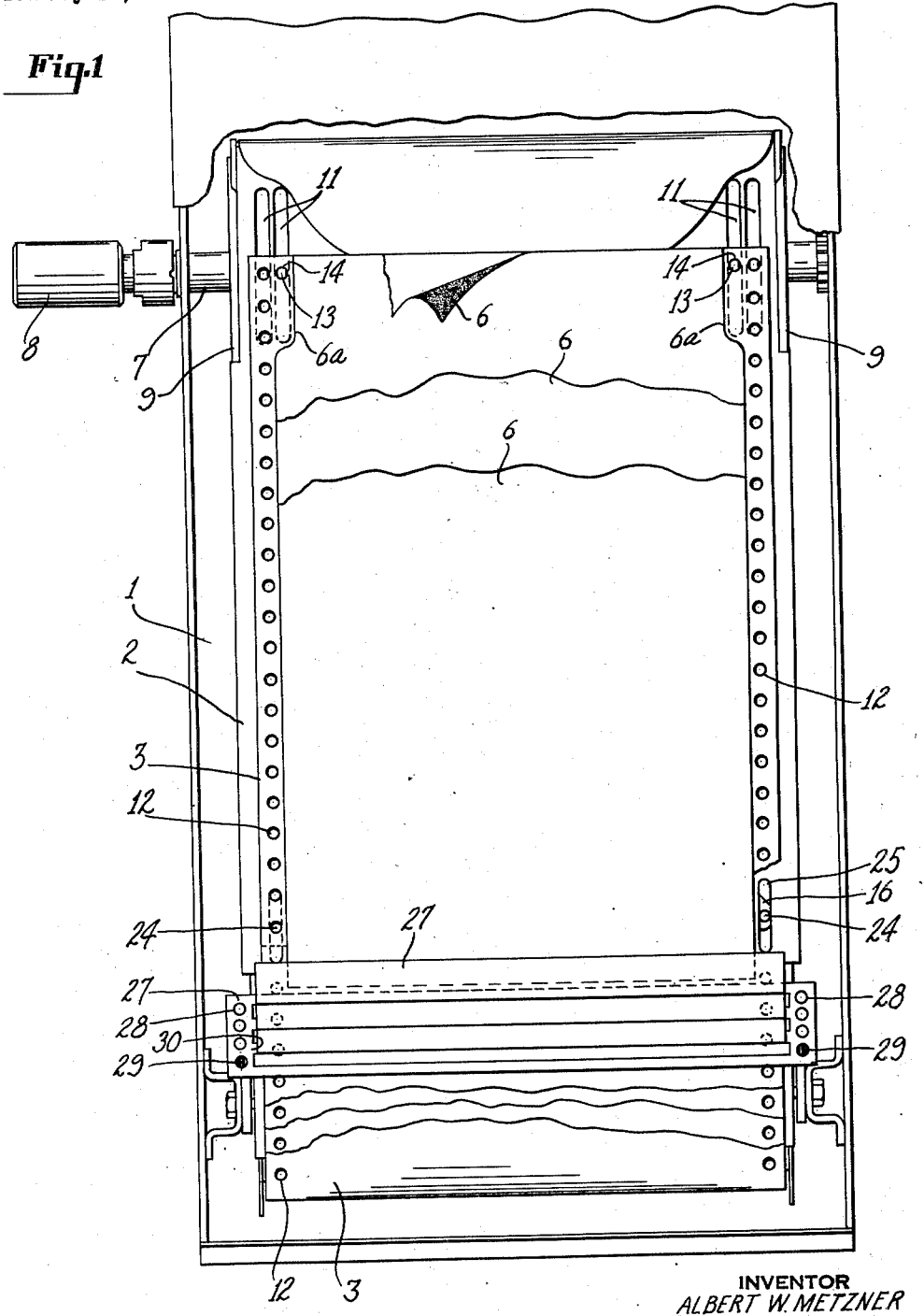
INVENTOR
ALBERT W. METZNER
BY
ATTORNEY Aug. 1, 1950  A. W. METZNER  2,516,899
AUTOGRAPHIC REGISTER
Filed May 14, 1945  6 Sheets-Sheet 2
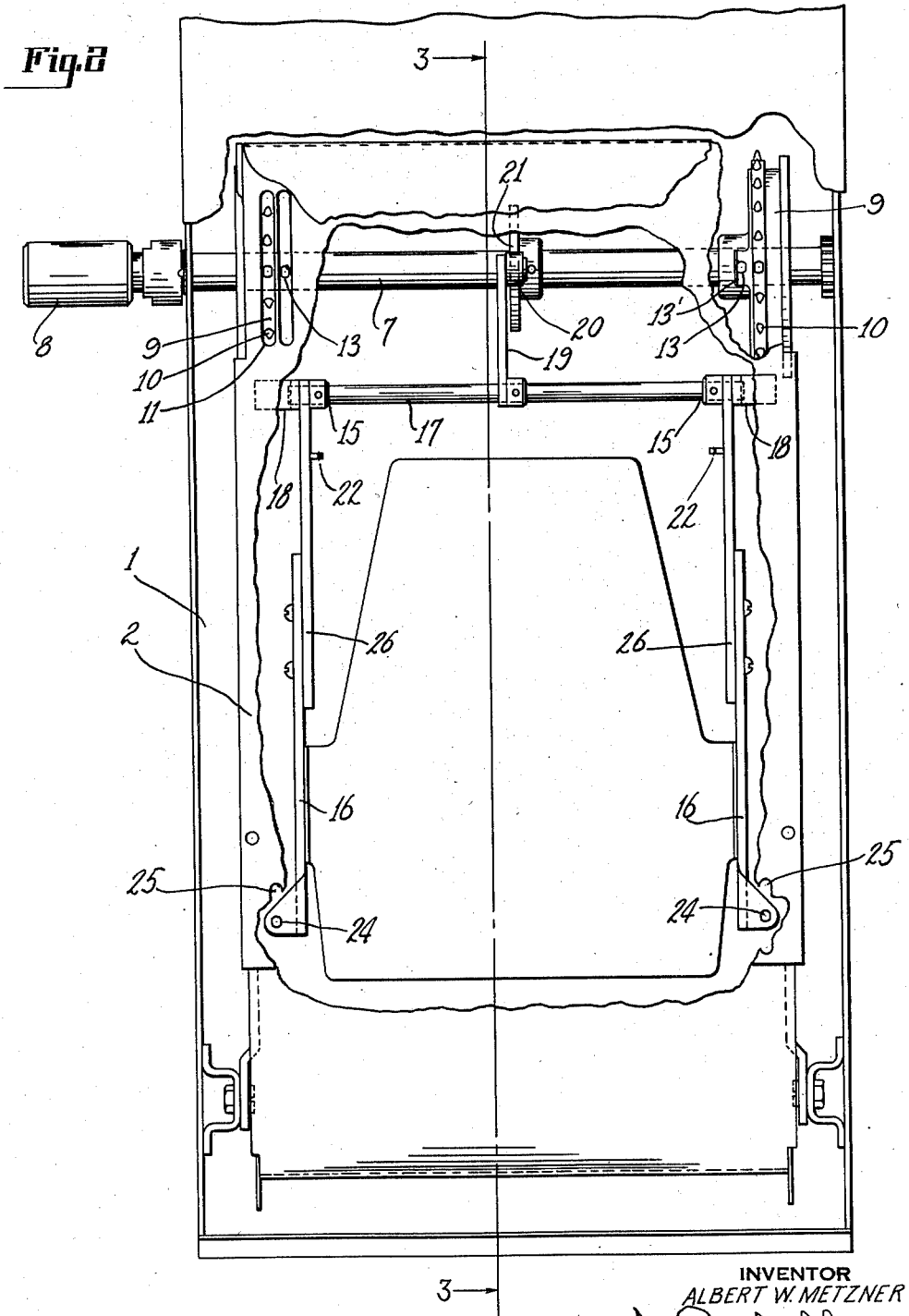
INVENTOR
ALBERT W. METZNER
JE Walker
ATTORNEY Aug. 1, 1950  A. W. METZNER  2,516,899
AUTOGRAPHIC REGISTER
Filed May 14, 1945  6 Sheets-Sheet 3
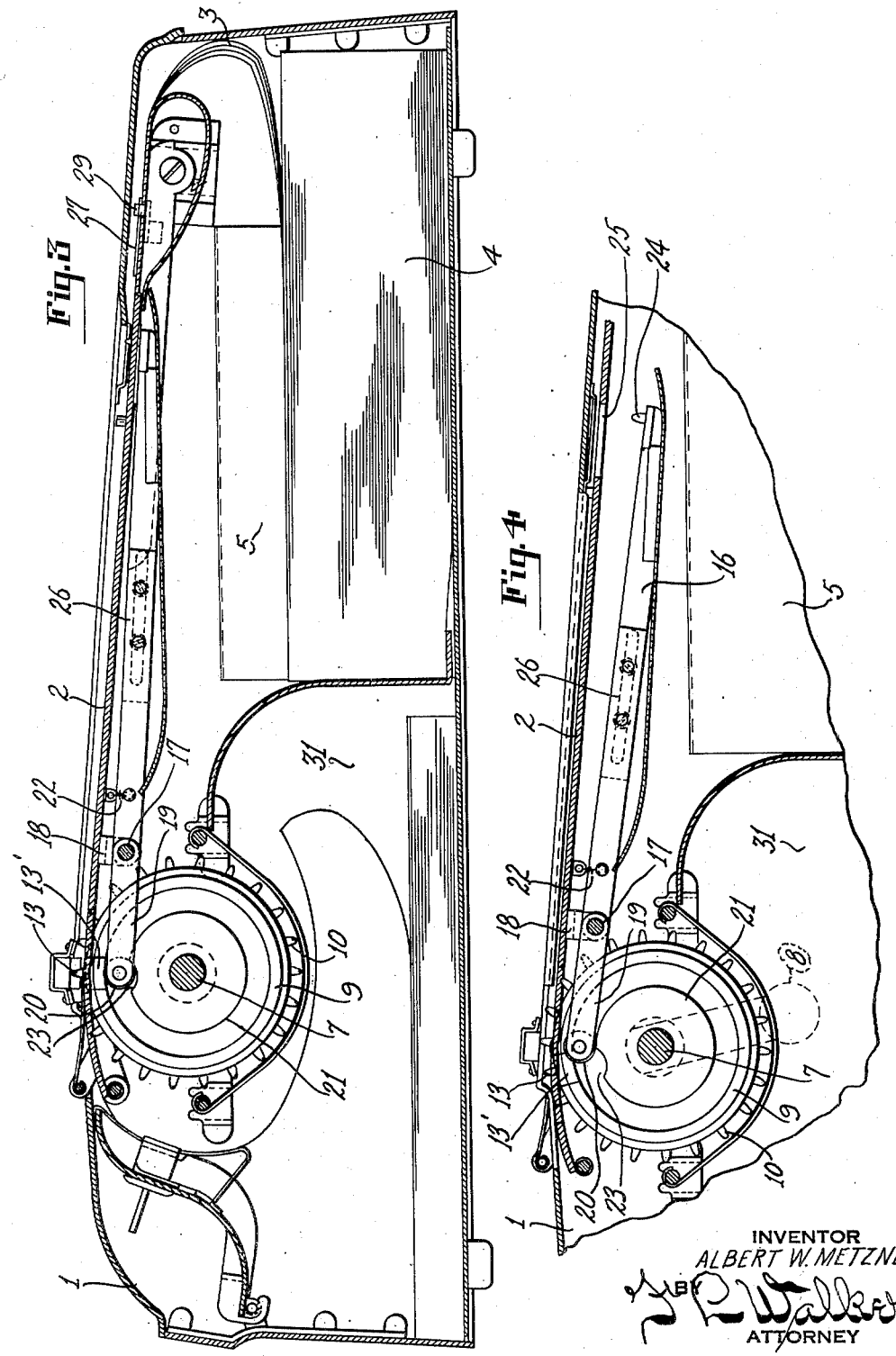
INVENTOR
ALBERT W. METZNER
BY
ATTORNEY Aug. 1, 1950　　　　　A. W. METZNER　　　　　2,516,899
AUTOGRAPHIC REGISTER
Filed May 14, 1945　　　　　　　　　　　　　　6 Sheets-Sheet 4
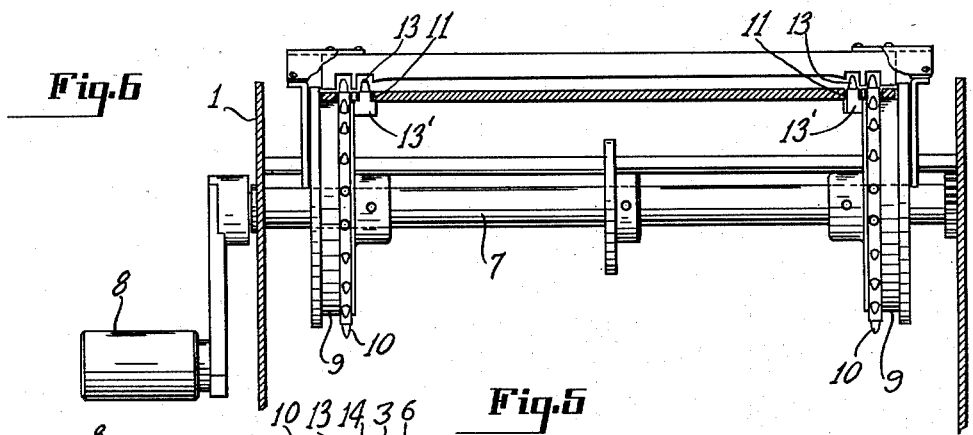
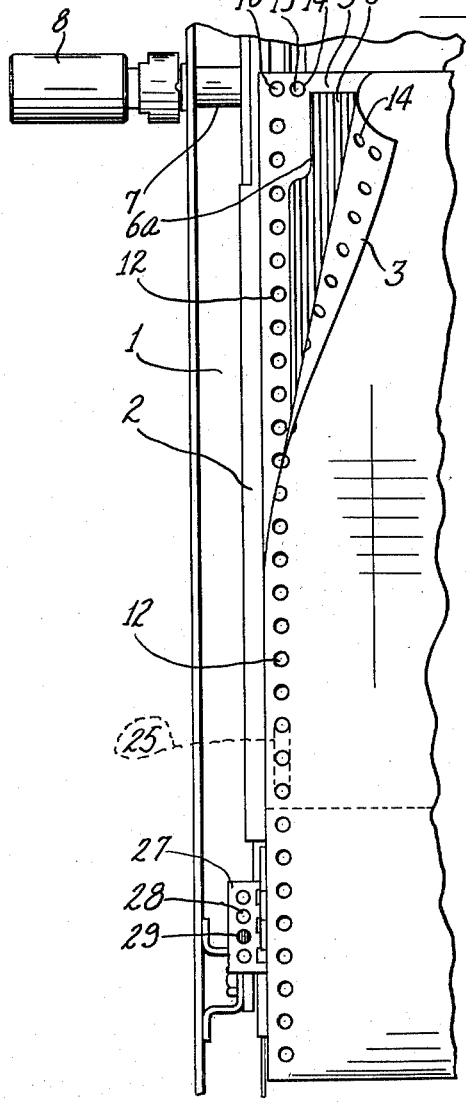
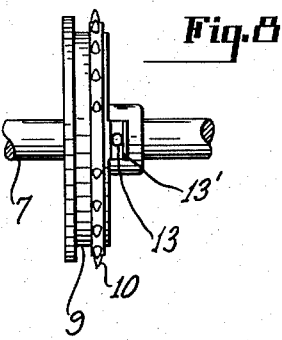
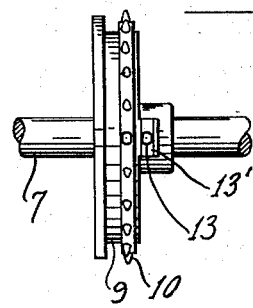
INVENTOR
ALBERT W. METZNER
ATTORNEY Aug. 1, 1950  A. W. METZNER  2,516,899
AUTOGRAPHIC REGISTER
Filed May 14, 1945  6 Sheets-Sheet 5
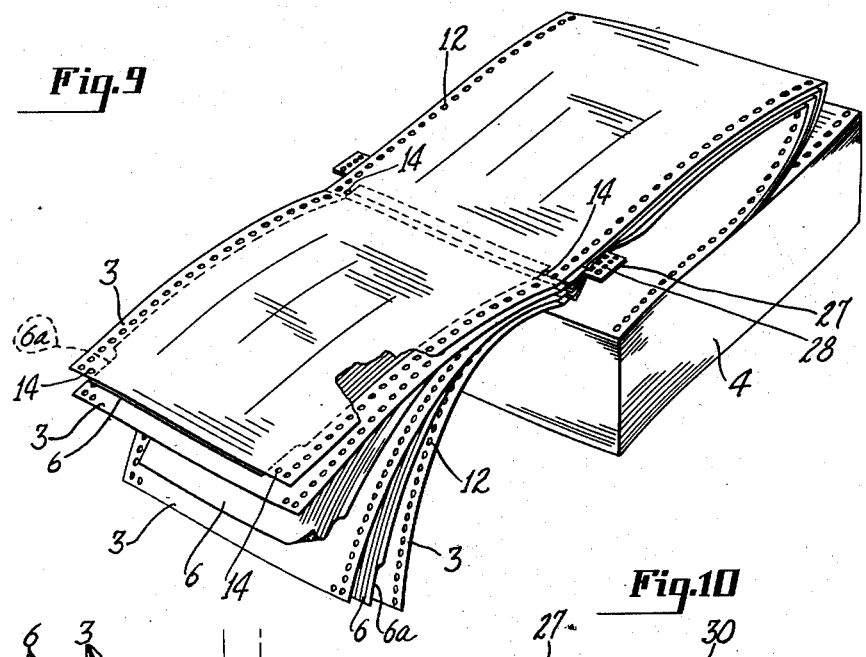
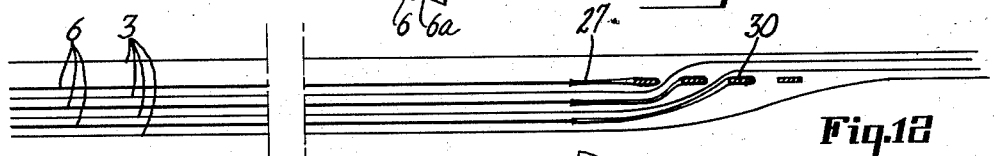
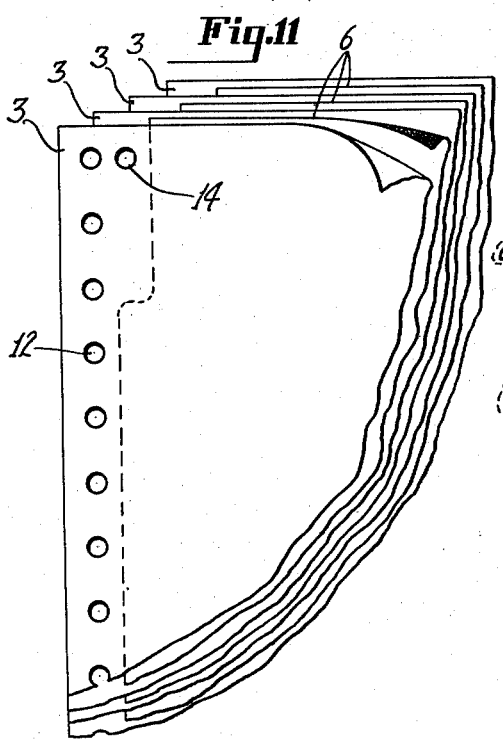
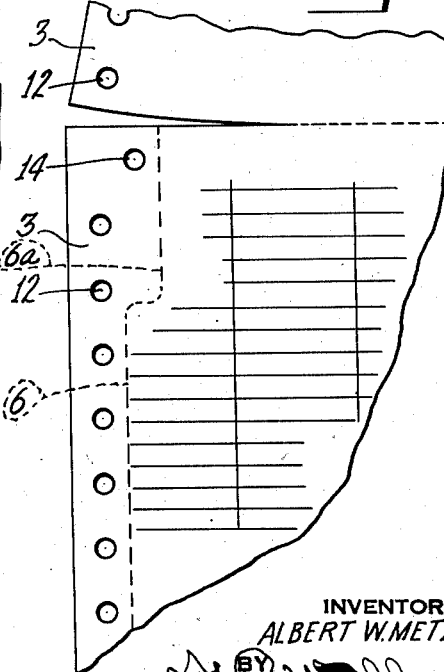
INVENTOR
ALBERT W. METZNER
BY
ATTORNEY Aug. 1, 1950     A. W. METZNER     2,516,899
AUTOGRAPHIC REGISTER
Filed May 14, 1945     6 Sheets-Sheet 6
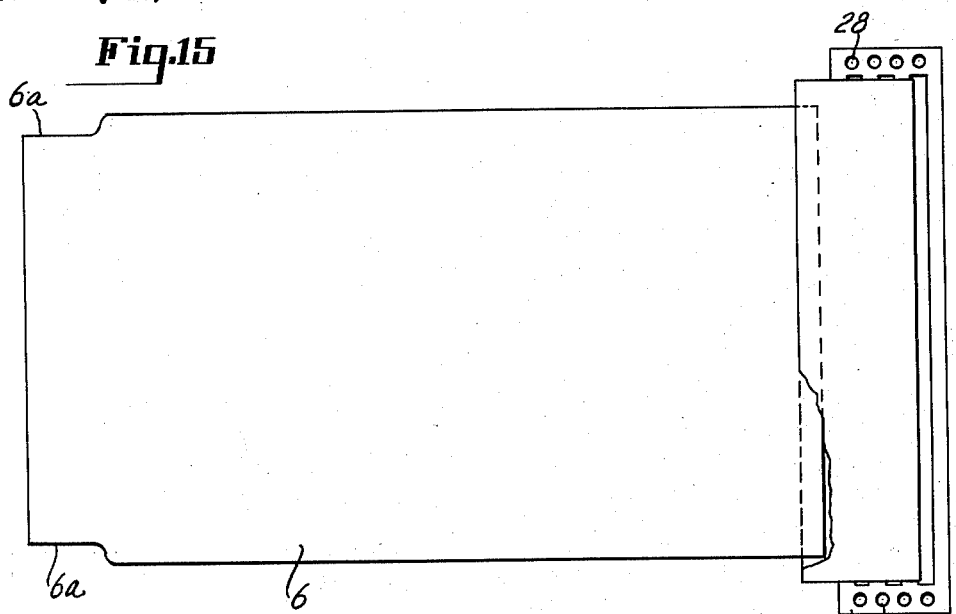
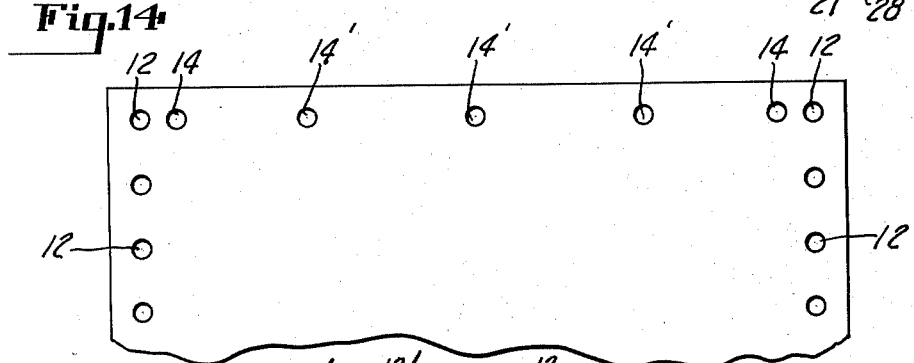
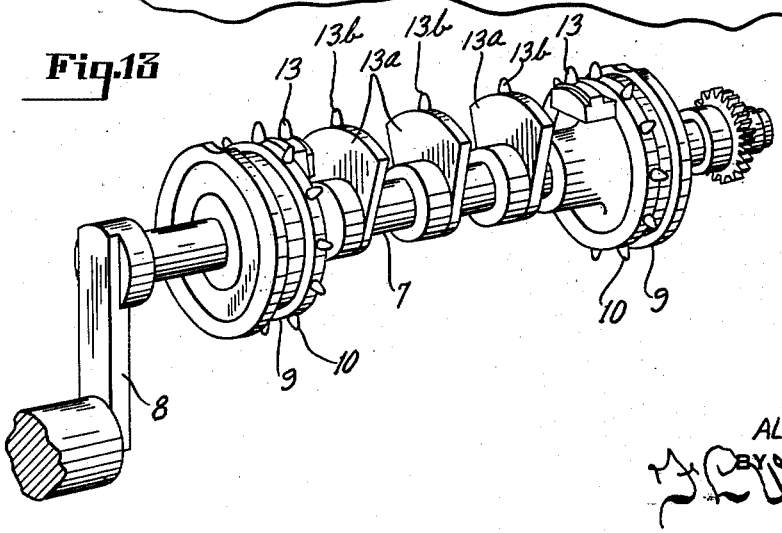
INVENTOR
ALBERT W. METZNER
ATTORNEY Patented Aug. 1, 1950

2,516,899

UNITED STATES PATENT OFFICE 2,516,899

AUTOGRAPHIC REGISTER

Albert W. Metzner, Dayton, Ohio, assignor to The Standard Register Company, Dayton, Ohio, a corporation of Ohio Application May 14, 1945, Serial No. 593,633

27 Claims. (Cl. 282—5)

This invention pertains to recording and manifolding apparatus, wherein pin type feeding devices are progressively engageable in longitudinally spaced feed holes in superposed record strips for advancing the strips past a recording position and relative to interleaved carbon or transfer material, and more particularly to auxiliary strip starting means for distributing the pulling strain or initial tension upon the strips necessary to overcome the inertia and resistance thereof to advancement, thereby minimizing mutilation of the strips and duofunctionally assuring interengagement of the strips with the feeding devices in predetermined relation for synchronized operation, and the duofunctional use of the feed holes for anchoring the trailing portions of the strips while being inscribed, and additional means for enabling periodic shifting of the interleaved transfer material to present successive fresh areas at the transfer position.

The object of the invention is to improve the construction as well as the means and mode of operation of recording and manifolding apparatus employing intermittently advanced record strips, whereby it may not only be economically manufactured, but will be more efficient in use, automatic in operation, uniform in action, having relatively few operating parts and be unlikely to get out of repair.

Further primary objects of the invention are to embody in such apparatus the hereinbefore mentioned advantageous features of distributing the initial starting strain upon the strips while breaking the adhesion of interleaved transfer material to the strips and initiating their advancement, providing definite locating means for the record strips by which the advancement of the record strips is synchronized with the feeding devices, enabling the record receiving portions of the strips to be fixedly held at relatively spaced fore and aft positions while being inscribed, and providing for minute adjustment of the transfer material to periodically afford fresh writing surfaces.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the accompanying drawings, wherein the invention is illustrated in its preferred but obviously not necessarily its only form of embodiment, for illustrative purposes it is shown as incorporated in an autographic register.

Fig. 1 is a top plan view of an assembled autographic register embodying the present invention, the top of which has been removed and portions of the superposed record strips torn away.

Fig. 2 is a further plan view of the autographic register, with a portion of the writing tablet broken away in addition to removal of the record strips.

Fig. 3 is a longitudinal vertical sectional view thereof through the assembled register while in record receiving condition.

Fig. 4 is a similar sectional view thereof, partly broken away, while in strip feeding condition, with the strip anchor members withdrawn.

Fig. 5 is a detail plan view of a portion of the autographic register, illustrating the pin type feeding device and the corresponding record strip or stationery for use therewith.

Fig. 6 is a transverse vertical sectional view, showing the pin type feeding devices and other cooperating parts.

Fig. 7 is a top plan view of one pin wheel feeding unit removed from the apparatus.

Fig. 8 is a similar view of a modified pin wheel unit.

Fig. 9 is a perspective view of a packet of marginally punched superposed strip stationery having transfer sheets interleaved therebetween.

Fig. 10 is a somewhat diagrammatic view illustrating the manner of interleaving the record strips and transfer sheets mounting.

Fig. 11 is a perspective view of a fragmentary portion of the manifolding assembly for use in apparatus illustrated.

Fig. 12 is a fragmentary detail view of a modification of the record strip stationery.

Fig. 13 is a detail view of a modification of the auxiliary strip starting means.

Fig. 14 is a fragmentary plan view of a modification of the record material.

Fig. 15 is a plan view of a transfer sheet and its holder.

Like parts are indicated by similar characters of reference throughout the several views.

While the invention has been illustrated and will be herein described as embodied in an autographic register, for which purpose it is well adapted, it is not limited thereto but may be incorporated in other manual or power operated mechanical writing, imprinting and recording apparatus employing continuous strip stationery, such as typewriters, tabulators, billing and listing machines, addressing machines, and analogous apparatus.

The illustrative autographic register herein disclosed includes a box-like cabinet 1, having at its top a plate forming a writing tablet 2. Superposed continuous record strips 3 are withdrawn from a supply packet 4 thereof located in a supply compartment 5 beneath the writing tablet for intermittent advancement over the writing tablet 2, where succeeding areas thereof are temporarily arrested while receiving inscribed record indicia thereon.

Interleaved between the superposed record strips are sheets 6 of carbon or transfer material, by which facsimiles of the indicia inscribed upon the topmost strip are reproduced under pressure upon underlying record strips.

Beneath the forward end of the writing tablet 2 is a rotary feed shaft 7 journaled in bearings in the sides of the cabinet 1 and provided with a drive device, which for illustrative purpose has been shown as a crank handle 8, but which may be a power transmission device. Mounted in spaced relation upon the rotary feed shaft 7 are two pin wheels 9, having peripherally spaced radial feeding pins 10. The rotary feed shaft 7 is so located in spaced relation with the writing tablet 2 that the peripheries of the pin wheels 9 extend through slots 11 in the writing tablet 2 into substantially tangential relation with the strip receiving surface of the writing tablet. The feeding pins 10 of said pin wheels project somewhat therebeyond and are progressively engageable in marginally punched, longitudinally spaced feed holes 12 in the superposed record strips which are thereby caused to register with those of under or overlying strips. The record strips 3 preferably, but not necessarily, comprise successions of series connected detachable printed forms separable into individual record sheets when inscribed. The individual forms are of lengths corresponding to the peripheral extent of the pin wheels 9, so that the strips are preferably advanced a full form length, or predetermined multiple thereof, at each rotation of the pin wheels.

The interleaved transfer material 6 is somewhat tacky or slightly adhesive, and the pressure required to effect transfer of inscribed indicia from one record strip to another tends to cause the record strips and interleaved transfer material to adhere one to the other. The transfer sheets being stationarily held in their adjusted positions, as will hereafter be explained, their adherence tends to resist advancement of the record strips. It requires more effort to overcome the combined resistance or to break the record strips 3 loose from the transfer sheets when initiating their advancement than is required to continue such movement to draw the succeeding record receiving areas or detachable forms of the plural superposed strips into inscribing position upon the writing tablet.

The marginal feed holes 12 of the strips being in close proximity to the edges of the strips, and relatively closely spaced in the series, the material of the strips is weakened thereby, especially if the record strip stock is thin or frail, to such extent that it will not withstand the initial strain or tension necessary to break the adhesion of the transfer material and the pull required to start advancement of the strips. Consequently, the feed holes adjacent to head or leading margins of the succeeding forms may be torn out and the strips mutilated.

To distribute the initial or starting strain imposed upon the strips, the pin wheels 9 are provided with auxiliary starting pins 13 engageable in inwardly spaced supplemental feed holes 14 adjacent to the heads or division lines of the separable record forms comprising the strips. The supplemental feed holes 14 being spaced further from the edges of the strips and out of line with the series of marginal feed holes 12 are located in stronger and more resistant areas of the record strips, which are less likely to be torn or mutilated.

In Figs. 1, 2, 5, 6 and 7 the auxiliary starting pins 13 are shown mounted in lateral lugs 13' on the pin wheels 9 in transverse aligned relation with one of the series of feeding pins 12. There are thus provided pairs of companion pins 10—13 which simultaneously engage in corresponding pairs of holes 12—14 in the record strips, which conjointly subject the engaged portions of the strips to starting strain or tension, which is automatically distributed between the pins of the respective pairs and throughout greater areas of the strips.

In lieu of using a pair of pins 10—13 for starting purpose, the feeding pin 10 at this point may be omitted, as in Fig. 8, and the auxiliary pin 13 being inwardly located for engagement in a stronger area of the strips, which is more resistant to tearing and mutilation, will be found sufficient under most conditions of use to initiate the advancement of the strips. The corresponding feed hole 12 may be left in the record strips, as shown in Fig. 11, where it will be idle and perform no feeding function because of the absence of the corresponding feeding pin 10. The corresponding feed hole 12 may be optionally omitted from the strips, as shown in Fig. 12, in the event the feeding pin 10 opposite the auxiliary starting pin 14 is omitted. As an alternative construction, the rotary feed shaft 7 may be provided with one or more segments 13a, as shown in Fig. 13, intermediate the pin wheels 9 and auxiliary starting pins 13, each segment being provided with a starting pin 13b engageable simultaneously with the pins 13 in corresponding supplemental holes 14', transversely aligned in the record strips, as shown in Fig. 14, to further divide and distribute the starting strain or tension required to overcome the inertia and initial resistance of the strips.

In assembling the pin wheels upon the feed shaft 7, they are so arranged that the pairs of pins 10—13, or the single auxiliary pins 13, as the case may be, are positioned at the tops of the pin wheels 9 at the end of their strip feeding operation when the pin wheels come to rest. In such positions they engage the corresponding holes 12—14, or 14 alone, in closely adjacent relation to the head or leading margins of the forms or record receiving areas to be inscribed. The pin wheels 9 and the record form areas being of commensurate size, the succeeding forms comprising the strips will be progressively engaged by the starting pins 13 in the same relation.

In order that the strips will stop and the succeeding record form areas be presented in the same predetermined position after each feeding operation, it is necessary that the feed holes 12 of the strips and feeding pins 10 of the pin wheels 9 be initially interengaged in a definite relation. Some difficulty has heretofore occurred in the use of marginally punched strip stationery, due to inexperienced operators engaging the strips with the pin wheels in such position that the strips and pin wheels do not synchronize and the record form areas will not come to rest in the proper position.

In the present instance the auxiliary starting pins 13 are duofunctionally employed also as locating elements to assure the engagement of the record strips with the pin wheels 9 in the proper relative relation.

Whether or not the auxiliary starting pin 13 is paired with a feeding pin 10, as in Fig. 7, or stands alone, as in Fig. 8, being inset relative to the line of marginal feed holes 12, and the corresponding supplemental starting holes 14 being disposed in a definite relation relative to the record receiving areas, it is quite impossible to interengage the record strips with the pin wheels, except in such proper relation wherein the auxiliary starting pins 13 engage in the supplemental holes 14. In any other than the predetermined and proper relation of the strips and pin wheels, an unpunched area of the record strips will register with the auxiliary starting pins 13 and the strips are thereby held elevated out of engagement of the adjacent feeding pins 10 in marginal holes 12. It is only when the auxiliary starting pins 13 are engageable in the supplemental holes 14 that feeding engagement of the pin wheel pins 10 in the feed holes 12 can be established. This is an important feature in assuring that the record strips shall be advanced a full form length at each operation of the pin wheels. As before stated, it is customary to proportion the size of the pin wheel to the length of the record form areas of the strips, so that the strips are advanced a full form length at each rotation of the pin wheels. However, the length of the periphery of the pin wheel may be any desired multiple of a form length of the strips, so that the strips may be advanced shorter form lengths by partial rotation of the pin wheel. In such event, the pin wheels would be provided with a plurality of auxiliary starting and locating pins 13 at different relatively spaced radial positions. Any one of the several auxiliary starting and locating pins would be equally effective in assuring the interengagement of the strips in synchronized relation with the pin wheels.

When inscribing a number of manifolded copies, which necessitates increased pressure on the original or topmost strip, there is a tendency for some of the superposed record strips to laterally shift or "side slip" relative to others out of exact registry. Anchor means is provided to overcome this difficulty and also to enable the utilization of the last record form, comprising the tail end of a supply strip, which lacking the resistance or tension imposed by pulling the strips from a supply pack, would otherwise be free for such unalignment. Feed holes 12 in distantly spaced relation with the points of engagement of the auxiliary pins 13 in the corresponding supplemental holes 14, and the feeding engagement of the pin wheel pins 10 in the feed holes 12, are duofunctionally utilized for such purpose.

Located beneath the writing table 2 and pivoted at 15 adjacent to the forward end thereof is an oscillatory frame, best shown in Figs. 2, 3 and 4. This frame includes a pair of parallel rearward extending arms 16 mounted on a rock shaft 17, journaled in dependent brackets 18 on the under side of the writing tablet 2. At a midpoint of the rock shaft is a forwardly extending arm 19 carrying a roller 20 which rides upon the periphery of a rotary cam 21 mounted on the feed shaft 7 and rotating in unison therewith to effect oscillatory motion of the frame against the tension of a retracting spring 22. The roller 20 rests in a depression 23 in the cam 21 during the inscribing operation while the pin wheels and the record strips are at rest. At such time the arms 16 are held elevated by the tension of the spring 22.

Carried on the rear end of each of the oscillatory arms 16 is a tapered pin 24, somewhat similar to the pin wheel pins 10 and starter pins 13, which when the arms are elevated by the retractile spring 22, project through corresponding slots 25 in the rear portion of the writing tablet 2 and thence into correspondingly located feed holes 12 adjacent the rear or trailing edges of the record areas or forms. The arms 16 are preferably, although not necessarily, jointed, as at 26 in Figs. 3 and 4, so that they may be extended or retracted to adjust the tapered anchor pins or studs 24 into registry with one or another of the feed holes 12 adjacent the trailing margin of the record receiving area or form positioned upon the writing tablet. When the feed shaft 7 and pin wheels 9 are actuated, the initial motion thereof elevates the roller 20 carried by the forward extending arm 19 from the depression 23 against the yielding resistance of the spring 22. Such movement effects depression of the arms 16 and thereby withdrawal of the anchor pins or studs 24 from the rearwardly located feed holes 12. The construction and timing is such that the cam engaging roller 20 rests upon the inclined side of the notch or depression 23, and responds to the initial movement of the cam 21 without lost motion. The taper of the anchor pins or studs 24 is such that it compensates for the initial movement of the strips under influence of the feeding and starting pins 10 and 13, while the anchor pins or studs 24 are being withdrawn, thereby permitting slight initial advancement of the strips simultaneously with the withdrawal of the anchor pins 24. The anchor pins 24 are retained in depressed positions by the engagement of the roller 20 upon the circular periphery of the cam 21 during the rotation of the pin wheels and the advancement of the record strips, until at the end of the feeding operation it again drops into the cam depression 23, and the anchor pins 24 are again engaged with the strips in their advanced positions. The tapered anchor pins 24, and also the auxiliary starting pins 13, are preferably, although not necessarily, of such diameter that they substantially fit the corresponding holes in which they are engageable, with only sufficient looseness to facilitate their entry thereinto and withdrawal therefrom. They thus restrict relative motion of the strips. The record receiving areas of the strips or record forms while on the writing tablet in record receiving position, are engaged in proximate relation with their four corners by the auxiliary pins 13 and anchor pins 24, whereby they are securely held against lateral shifting motion. This insures accurate registry of inscribed indicia with prescribed lines and spaces provided upon the underlying record material. It also enables the last form or record receiving area of a supply strip to be held equally as secure as preceding record portions of the strip, thus enabling the entire supply strip of forms to be used without waste. The repetitious recording of indicia in localized areas of the strips eventually exhausts the transfer media from the corresponding portions of the interposed carbon or transfer sheets, leaving, however, intermediate areas of unused media. To enable substantially the entire surface of such transfer material to be used and to maintain the legibility of the copies, the interleaved carbon sheets are mounted for adjustment longitudinally of the record strips through fractional line space distances. Various methods of manual or automatic adjustment may be employed. A convenient and economical way of adjustably mounting the transfer sheets is illustrated in the drawings, which comprises a transversely disposed slotted strip of cardboard or fiberboard 27, having at its opposite ends series of aligned spaced holes 28, within any one of which may be engaged locating studs 29 projecting vertically from the lateral margins of the writing tablet. The individual transfer sheets are engaged, each with a different spaced bar 30 of the slotted mounting strip 27 by gluing or clamping. The assembly of transfer sheets and slotted mounting strips 27 is bodily adjustable either forwardly or rearwardly relative to the record strips by manually disengaging the ends of the mounting strip 27 from the locating studs 29 and reengaging the studs 29 in different holes 28 of the strip. This adjustment is effective to shift the worn areas of the transfer sheets out of registry with the lines and spaces of the record strips in which the record indicia are to be inscribed and present fresh transfer areas in registry therewith.

To enable the interleaved transfer sheets 6 to be adjusted throughout a range determined by the series of holes 28 in the mounting card 27, the forward corners of the sheets 6 are cut out at 6a to afford clearance for the pin wheel 9 when the transfer sheets are advanced. The transfer sheets otherwise extend laterally to the line of the feed holes 12, permitting the full width of the strips intermediate the feed holes to be written upon.

The autographic register herein shown for illustrative purpose is employed in the usual manner by rotating the pin wheels 9 by means of the crank 8, or by power driving means which is well known in this art, to advance the inscribed set of detachable record forms from their position on the writing tablet, and draw a succeeding set of forms from the zigzag folded packet 4 in the supply compartment 3. The inscribed set of record forms advanced from the register are torn off on transverse weakened lines intermediate succeeding forms. If desired, only a portion of the strips may thus be separated into individual sheets or forms and the remainder thereof may be directed into a receiving or storage compartment 31 in the cabinet 1, as shown in Fig. 3. While positioned on the writing tablet in record receiving position, the set of forms to be inscribed are securely held at all four corners to prevent relative shifting motion and misalignment while writing thereon. The rearward anchor pins or studs are automatically withdrawn simultaneously with application of pulling strain necessary to break the adhesion of the record strips and interleaved transfer material and to overcome the inertia of the strips while initiating their advancement. By transversely distributing the pulling strain and applying such effort in inwardly spaced relation with the weakened margins of the strips, the danger of tearing or mutilating the strips while overcoming their resistance is minimized.

The herein described manifolding assembly comprising record strips having supplemental holes for engagement of auxiliary starting pins additional to their longitudinally spaced feed holes for engagement of pin type feeding devices, and adjustable mounting means for interleaved transfer sheets, forms the subject matter of a copending application for Letters Patent, Serial No. 593,634, now abandoned, filed concurrently herewith, to which cross reference is made.

Among the important advantages accruing from the present invention is the distribution of the force necessary to overcome the adhesion of the record from the strip to the underlying transfer material sheet, enabling the record forms to be pulled away from "sticky" carbon material by means of laterally offset feeding pins engaging in corresponding transversely spaced holes in the record strips, thus avoiding mutilation of the record forms by concentrating the pulling force in localized, otherwise weakened areas. It further provides a predetermined particular position only in which the record form strips and the register pin type feeding devices may be successfully interengaged, which positively prevents such engagement in other than a prescribed proper relation. The forms being held in writing position at all four corners effectually prevents shifting motion of the positioned record receiving form during the writing operation, and their automatic release at the completion of said operation facilitates rapid interchange of a fresh form for an inscribed form. The ability to periodically adjust the carbon or transfer sheets relative to the record strips enables the entire carbonized surface of the transfer sheet to be utilized and a considerable economy to be effected. The next succeeding record form remaining in writing position upon advancement of the preceding inscribed form being held in its adjusted position by multiple pins simultaneously engaging the transverse series of spaced holes in the form, much better resists displacement and mutilation of the remaining form by careless grasping of the advanced inscribed form for separation from the record strip. This obviates a common problem heretofore encountered in the use of detachable record forms issued from a conventional register by a careless operator.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A recording apparatus wherein plural superposed marginally punched continuous form record strips are intermittently advanced past a record receiving position and relative to interleaved transfer material by pin type feeding means progressively engageable in the marginally punched holes thereof, including a pair of pins disposed side by side and simultaneously engageable in a pair of laterally spaced holes and effective to conjointly initiate the advancement of the record strips subsequent to which at least one of the pins is automatically disengageable from the record strips, both said pins being in record strip engaging position at the end of each strip feeding operation to assure proper positioning of the record strips with the strip engaging pins and preventing their interengagement in other than predetermined relation, and an anchor pin disposed in distantly spaced relation with said pair of pins engageable in a corresponding hole in the record strips while the latter are in record receiving position to hold the trailing portion of the strips against lateral displacement, and automatic actuating means for withdrawing the anchor pin from engagement with the strips and reengaging it therewith in synchronism with the actuation of said pair of pins.

2. A recording apparatus, wherein a plurality of superposed marginally punched record strips are intermittently advanced past a recording position and relative to interleaved transfer material therebetween by pin type feeding means progressively engageable in the marginally punched holes, including at least one dual functional supplemental feeding pin temporarily engageable in a corresponding hole in the record strips in unaligned relation with the marginally punched holes in the strips while the strips are in record receiving position, and automatically retractible therefrom upon initiation of the strip feeding operation to afford initial pulling effort to the strips to overcome resistance thereof incident to adhesion of the interleaved transfer material thereto preparatory to further advancement thereof by the pin type feeding means, and affording indexing means to assure initial interengagement of the record strips and pin type feeding means in a predetermined relation while the feeding means is in its initial strip engaging position.

3. A recording apparatus, wherein plural superposed marginally punched record strips are intermittently advanced past a record receiving position and relative to interleaved transfer material by traveling pin type feeding means progressively engageable in the marginally punched holes, including at least one auxiliary feeding pin temporarily engageable in a corresponding hole in the record strips in spaced relation with the marginally punched feed holes therein and effective to overcome adhesive resistance of the interleaved transfer material to advancement of the strips, and initiate the advancement of the strips and subsequently automatically retractible therefrom preparatory to their further advancement by the said traveling pin type feeding means engageable in the marginally punched holes thereof independently of said auxiliary feeding pin.

4. A recording apparatus, wherein plural superposed marginally punched record strips are intermittently advanced past a record receiving position by pin type feeding means progressively engageable in uniformly spaced marginally punched holes in the strips, and wherein it is desirable that the strips be engaged in predetermined longitudinally adjusted relation with the pin type feeding devices, including an auxiliary pin temporarily engageable in a corresponding hole in the record strips in offset relation with the uniformly spaced marginally punched holes when the strips are engaged in predetermined relation with the pin type feeding means and preventing interengagement of the feeding means and the strips in other than their predetermined relation, said pin being automatically retractible therefrom upon initiation of the advance feeding operation upon the strips.

5. A recording apparatus, wherein plural superposed marginally punched record strips are intermittently advanced past a recording position by pin type feeding means progressively engageable therein, including an anchor pin in fixed distantly spaced relation with the pin type feeding means engageable in said marginally punched feed holes simultaneously with the pin type feeding means while the record strips remain stationary in the record receiving position, and means for automatically withdrawing the anchor pin therefrom and reengaging it therein in synchronism with the initiation and arrest of the feeding operation of the pin type feeding means.

6. A recording apparatus, wherein plural superposed record strips are intermittently advanced past a recording position and relative to interleaved transfer material, including a main strip feeding means having continuous uninterrupted engagement with the strips for progressively advancing the strips past the recording position, and a supplemental strip feeding means temporarily engageable therewith simultaneously with the engagement of the main strip feeding means while advancement of the strips is being initiated and effective in overcoming resistance of the strips to advancement thereof, said auxiliary feeding means being automatically disengageable from the record strips upon initiation of their advance movement.

7. A recording apparatus, wherein plural superposed record strips are intermittently advanced past a recording position and relative to interleaved transfer material therebetween, including a strip feeding means having continuous uninterrupted engagement with the strips for progressively advancing the strips through a predetermined range of travel, and a strip starting device having temporary simultaneous feeding engagement with the strip to overcome resistance of the transfer material to movement of the strips and to initiate their advancement, said starting device being automatically disengageable therefrom when advancement of the strips has been initiated, while the strips continue to advance under influence of the strip feeding device.

8. A strip feeding apparatus, including a main feeding device having continuous uninterrupted marginal feeding engagement with a strip for progressively advancing the strip through a predetermined range of travel, and a strip starting device temporarily engageable with the strip in inwardly spaced relation with the path of simultaneous marginal engagement of the main feeding device therewith and automatically disengageable therefrom when the advancement of the strip has been initiated.

9. An autographic register, wherein marginally punched continuous form record strips are progressively advanced relative to past a recording position by pin type feeding means engageable with marginal feed holes in the stationery, which feeding means retains its engagement with the feed holes until the stationery is past the recording position, including an additional anchor pin engageable with another of the marginal feed holes in distantly spaced relation with the hole engaging feeding device to anchor the stationery against lateral shifting position while the stationery is at rest in the recording position, and means for intermittently disengaging and reengaging the anchor pin in synchronism with advancement of the strips.

10. An autographic register, wherein a pin type feeding device is progressively engageable in marginally punched holes in a record strip to advance the strip relative to a recording position, and to subsequently hold the strip in the recording position to which it is advanced, including a supplemental non-feeding anchor pin in distantly spaced relation with the pin type feeding device engageable in another marginal feed hole of the strip to hold the strip against shifting motion while the strip remains in the recording position.

11. An autographic register, wherein a pin type feeding device is progressively engageable in marginally punched holes in a record strip to advance the strip relative to a recording position, and to subsequently hold the strip in the recording position to which it is advanced, including a supplemental non-feeding anchor pin in distantly spaced relation with the pin type feeding device engageable in another marginal feed hole of the strip to hold the strip against shifting motion while the strip remains in the recording position, and actuating means common to the pin type feeding device and anchor pin for automatically withdrawing the anchor pin preparatory to advancement of the strip and for automatically reengaging the anchor pin therewith at the conclusion of the strip feeding operation.

12. In an autographic register, wherein a rotary pin wheel feeding device is progressively engageable in a series of marginally punched holes in a record strip to progressively advance the strip relative to a recording position, including a supplemental pin carried by the pin wheel in laterally offset relation with the feeding pins thereof and positioned uppermost at the end of the strip feeding operation and engageable in a corresponding hole in the record strip to prevent engagement of the marginally punched strip with the pin wheel in other than a predetermined relation wherein said supplemental pin is engageable in said corresponding hole.

13. In an autographic register, wherein a rotary pin wheel feeding device is progressively engageable in a series of marginally punched holes in a record strip to progressively advance the strip relative to a recording position, means for predetermining the particular point of initial engagement of the pin wheel in relation with the series of marginally punched holes, including a supplemental pin in the pin wheel in laterally offset relation with the marginal hole, engaging pins thereof engageable in a corresponding hole in the strip when the strip is in a predetermined relatively adjusted pin wheel engaging position and preventing engagement therewith in any other relative position.

14. In an autographic register, wherein a rotary pin wheel feeding device is progressively engageable in a series of marginally punched holes in a record strip to progressively advance the strip relative to a recording position, means for assuring interengagement of the strip and pin wheel in a predetermined relation, and preventing interengagement thereof in other relation, comprising at least one pair of pins arranged side by side at the top of the pin wheel when the latter is at rest at the termination of a strip feeding operation, and engageable in a corresponding pair of holes in proximate relation with the leading edge of a record receiving area of the strip, one of which pair of holes is one of the series of marginal feed holes of the strip.

15. An autographic register, wherein a plurality of superposed record strips are progressively advanced past a recording position relative to short length stationary sheets of carbon or transfer material interleaved therebetween, including a flat holder for the plurality of carbon sheets, relatively spaced slots therein through which the carbon sheets project for engagement therewith, and means for fixedly securing the holder and associated carbon sheets in one of several different positions of adjustment in alignment with the direction of travel of the record strips past the recording position.

16. An autographic register, wherein a plurality of superposed record strips are progressively advanced past a recording position relative to short length stationary sheets of carbon or transfer material interleaved therebetween, including a flat holder for the plurality of carbon sheets, a series of longitudinally spaced holes in the holder, and a stationary locating stud over which any selected hole of the series is engageable to anchor the carbon sheet holder and associated sheets in selective positions aligned with the recording position to present fresh transfer areas thereof in registry with writing lines of the strips.

17. An autographic register, wherein a plurality of superposed record strips are progressively advanced past a recording position relative to short length stationary sheets of carbon or transfer material interleaved therebetween, including a flat holder for the plurality of carbon sheets, means for retaining the holder in a plane substantially coincident with the recording position, and manually adjustable means for shifting the position of the carbon sheets relative to the record strips through small increments in a direction aligned with the path of travel of the latter past recording position to present successive fresh transfer areas of the carbon sheets in registry with writing lines of the record strips.

18. An autographic register, wherein a plurality of superposed record strips are progressively advanced past a recording postion relative to short length stationary sheets of carbon or transfer material interleaved therebetween, including a flat holder for the plurality of carbon sheets, and means for adjustably engaging the holder with a stationary portion of the register in a plane substantially coincident with the recording position thereof, the construction and arrangement being such that the position of the holder and the attached carbon sheets may be shifted relative to the record strips through small increments in a plane aligned with the path of travel of the latter past recording position to present successive fresh transfer areas of the carbon sheets in registry with writing lines of the record strips.

19. The herein described method of feeding a continuous strip of series connected record forms, including the step of imparting to a marginal portion thereof progressive uninterrupted feeding influence sufficient to advance the strip through a predetermined range of motion, and imparting to the leading edge thereof a preliminary feeding impulse additional to such feeding influence sufficient to overcome the initial resistance of the strip to advancement, and terminating the preliminary feeding impulse upon starting of the strip movement while the advancement thereof is continued by the feeding influence applied to the margin thereof.

20. The herein described method of feeding a continuous strip of series connected record forms, including the step of imparting to a marginal portion thereof progressive uninterrupted feeding influence sufficient to advance the strip through a predetermined range of motion, and temporarily distributing the initial feeding impulse transversely of the strip inwardly of the marginal feeding area thereof to assist in overcoming initial resistance of the strip to advancement thereof.

21. The herein described method wherein a continuous strip of series connected forms is intermittently advanced and succeeding forms thereof arrested in a recording position, including the step of holding the arrested form in the recording position by engaging two pins in corresponding holes in the form in proximity to the forward corners of the form and simultaneously engaging two other pins in corresponding holes in proximity to the rear corners of the arrested form to prevent relative shifting motion hereof.

22. The herein described method wherein a continuous strip of marginally punched series connected forms is intermittently advanced and a selected form thereof then held in its advanced position, including progressively engaging the marginal holes thereof to advance the strip and subsequently engage stationary detent means simultaneously in different widely separated marginal holes in the strip in proximate relation with the leading and trailing edges thereof to hold the selected form against relative shifting motion.

23. The herein described method of assuring the engagement of a continuous strip of series connected forms in predetermined relation with a pin type feeding device, including simultaneously engaging a locating member supplemental to the pin type feeding device in a corresponding hole in the strip in offset relation with the area thereof engaged by the pin type feeding device, and subsequently withdrawing the locating member therefrom upon initial advancement of the strip and preventing interengagement of the strip and such locating member in any other than the predetermined position by an imperforate area of the strip.

24. The herein described method of securing a selected form of a strip of series connected record forms in a record receiving position to which it shall have been moved, including interengaging separate then stationary locating pins in corresponding holes in proximate relation to the four corners of the selected form to hold the latter against relative shifting motion.

25. An autographic register wherein marginally punched continuous form stationery is progressively advanced past a recording position by a pin type feeding device having progressive engagement in longitudinally spaced aligned marginal feed holes therein, including a pin wheel having a pair of pins simultaneously engageable in a pair of laterally spaced holes when the pin wheel and stationery are in their initial position and a stop pin in distantly spaced relation with the pin wheel simultaneously engageable in a correspondingly positioned hole in the stationery while the latter is in recording position.

26. An autographic register wherein marginally punched continuous form stationery is progressively advanced past a recording position by a pin type feeding device having progressive engagement in longitudinally spaced aligned marginal feed holes therein, including a pin wheel having a pair of pins engageable in one of the marginal feed holes and simultaneously engageable in an inwardly spaced hole in the stationery when the record material is in recording position, and an additional pin in distantly spaced relation with the pin wheel engageable in another of the marginal feed holes of the stationery while the latter remains in recording position.

27. An autographic register wherein marginally punched continuous form stationery is progressively advanced past a recording position by pin type feeding means progressively engageable in longitudinally spaced marginal feed holes therein including traveling feeding pins progressively engageable in the aligned marginal feed holes to advance the stationery relative to the recording position, and a plurality of transversely aligned supplemental pins in inwardly spaced relation with the traveling feeding pins simultaneously engageable while the stationery is in recording position in corresponding holes in the stationery in inwardly spaced relation with the aligned marginal feed holes.

ALBERT W. METZNER.

REFERENCES CITED

The following references are of record in the file of this patent:

UNITED STATES PATENTS

| Number | Name | Date |
| --- | --- | --- |
| 1,281,252 | Johnson et al. | Oct. 8, 1918 |
| 1,571,448 | Johnson | Feb. 2, 1926 |
| 1,767,689 | Metzner | June 24, 1930 |
| 1,896,078 | Hagemann | Feb. 7, 1933 |
| 2,033,742 | Schroeder | Mar. 10, 1936 |
| 2,072,133 | Sherman | Mar. 2, 1937 |
| 2,211,304 | Waechter | Aug. 13, 1940 |
| 2,328,081 | Johnson | Aug. 31, 1943 |